(12) United States Patent
Takada (10) Patent No.: US 8,436,884 B2
(45) Date of Patent: May 7, 2013

(54) IMAGE FORMING APPARATUS (75) Inventor: Kazumasa Takada, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 255 days.

(21) Appl. No.: 13/036,373

(22) Filed: Feb. 28, 2011

(65) Prior Publication Data
US 2011/0216144 A1 Sep. 8, 2011

Related U.S. Application Data (60) Provisional application No. 61/310,963, filed on Mar. 5, 2010.

(51) Int. Cl.
*B41J 2/435* (2006.01)
*B41J 2/47* (2006.01)

(52) U.S. Cl.
USPC ............................ 347/237; 347/247; 347/249

(58) Field of Classification Search .................. 347/237, 347/247
See application file for complete search history.

(56) References Cited

U.S. PATENT DOCUMENTS

| 5,760,816 | A | * | 6/1998 | Morrison | 347/247 |
| 7,126,622 | B2 | * | 10/2006 | Omae et al. | 347/237 |
| 7,961,209 | B2 | * | 6/2011 | Nagumo | 347/237 |

FOREIGN PATENT DOCUMENTS
JP 2009-251605 10/2009

* cited by examiner

*Primary Examiner* — Uyen Chau N Le
*Assistant Examiner* — John M Bedtelyon
(74) *Attorney, Agent, or Firm* — Turocy & Watson, LLP (57) ABSTRACT

According to one embodiment, when performing monochrome image forming, image processing circuits for color image forming, laser control circuits for the color image forming and data processing circuits for the color image forming in an integrated circuit are not operated.

17 Claims, 9 Drawing Sheets

IMAGE FORMING APPARATUS

CROSS-REFERENCE TO RELATED APPLICATIONS

This application is based upon and claims the benefit of priority from U.S. provisional application No. 61/310,963, filed on Mar. 5, 2010, the entire contents of which are incorporated herein by reference.

FIELD

Embodiments described herein relate generally to an image forming apparatus.

BACKGROUND

An image forming apparatus capable of color copying includes a plurality of photoconductive drums used in image forming for the colors yellow, magenta, cyan, and black. In addition the apparatus includes a plurality of laser units which emit laser beams for exposing with respect to the photoconductive drums.

In such an image forming apparatus, there is a tendency toward increased power consumption accompanying the recent increases in image quality and functionality.

DETAILED DESCRIPTION

In general, according to one embodiment, an image forming apparatus including: a plurality of image holding bodies; an exposure unit that includes a plurality of laser units which emits laser beams and performs main scanning and sub-scanning of the respective image holding bodies by the laser beams emitted from the respective laser units; a laser detecting unit that detects the laser beam emitted from one specific laser unit among the laser units as a reference position of the main scanning; an integrated circuit that includes a plurality of image processing circuits which process input image data in accordance with input first clock signals and output the processed image data at predetermined timing based on main scanning reference signals which is input; a plurality of laser control circuits which momentarily hold the output image data from the respective image processing circuits, output the held image data in accordance with input second clock signals, generate laser control signals for controlling the operation of the laser units in accordance with the main scanning reference signals, and output the laser control signals; a plurality of data processing circuits which are operated in accordance with the laser control signals output from the laser control circuits, convert the image data output from the respective laser control circuits into serial data signals then output the signals, output signals synchronized with the detection of the laser detecting unit as the main scanning reference signals, and output clock signals having predetermined frequency as the second clock signals; a selection section which selects any one of the main scanning reference signals output from the data processing circuits and supplies the signals to the respective image processing circuits; a plurality of first gate circuits which allow and block the input of the first clock signals to the respective image processing circuits by opening and closing; a plurality of second gate circuits which allow and block the input of the second clock signals to the respective laser processing circuits by opening and closing; and a selection circuit which has a first selection mode which respectively selects the laser control signals output from the laser control circuits and supplies the selected signals to the respective laser units and the respective data processing circuits, a second selection mode which selects any one of the laser control signals output from the laser control circuits and supplies the selected laser control signals to a plurality of the laser units having the specified laser unit among the laser units and the data processing circuits and to a plurality of data processing circuits corresponding to a plurality of the laser units, and is capable of selectively setting the first selection mode or the second selection mode; and a control section that sets the first selection mode in the selection circuit while opening all of the gate circuits in a case of an image forming mode using the respective image holding bodies and sets the second selection mode in the selection circuit while closing the remaining gate circuits whereas only opening the first gate circuits and the second gate circuits which correspond to the specified image holding bodies among the respective gate circuits in a case of the image forming mode using only one specific image holding body among the respective image holding bodies.

Hereinafter, the embodiment will be described with reference to the accompanying drawings.

Figure 1:
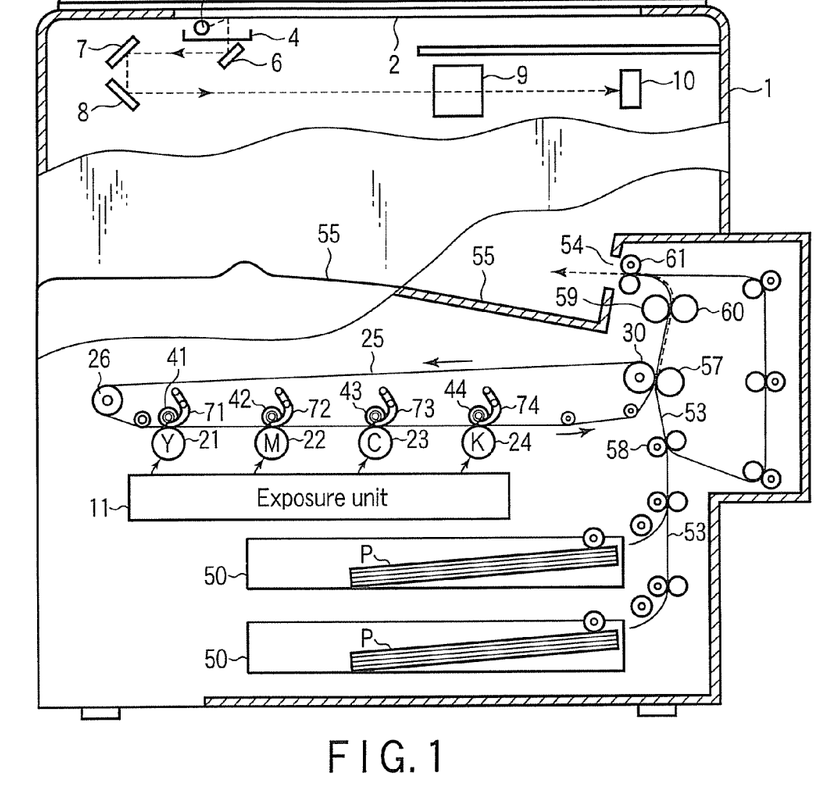
FIG. 1 is a diagram illustrating the overall configuration of an embodiment.

As shown in FIG. 1, a document board (a glass board) 2 is disposed on an upper portion of a main body 1. A cover 3 is disposed on the document board 2. In addition, a carriage 4 is disposed at the lower side of the document board 2 and an exposure lamp 5 is disposed in the carriage 4. The carriage 4 reciprocates along the lower surface of the document board 2. Documents on the document board are exposed by reciprocation of the carriage 4 and lighting of the exposure lamp 5. Through this exposure, an image of the document is read optically. The read image is projected to a CCD 10 through reflective mirrors 6, 7, and 8 and a lens block 9. Then, the CCD 10 outputs an image signal corresponding to the read image.

The image signal which is output from the CCD 10 becomes image data after processing in an image processing section 92 described below. The image data is supplied to an exposure unit 11. The exposure unit 11 respectively exposes by using 4 laser beams a photoconductive drum 21 which is an image holding body for yellow color image forming, a photoconductive drum 22 which is an image holding body for magenta color image forming, a photoconductive drum 23 which is an image holding body for cyan color image forming and a photoconductive drum 24 which is an image holding body for black color image forming.

A transfer belt 25 is disposed on the photoconductive drums 21, 22, 23 and 24. The transfer belt 25 rotates on a track of a driver roller 26 and a driven roller 30 in a counterclockwise direction with power of the driver roller 26. Primary transfer rollers 41, 42, 43 and 44 are disposed to move freely in the vertical direction at a position facing the photoconductive drums 21, 22, 23 and 24. The primary transfer rollers 41, 42, 43 and 44 rotate to allow the transfer belt 25 come into contact with the photoconductive drums 21, 22, 23 and 24 by means of displacement (moving downward) to the transfer belt 25 and transfer visible images on the photoconductive drums 21, 22, 23 and 24 to the transfer belt 25.

In addition, a plurality of paper cassettes 50 is disposed at the lower side of the exposure unit 11. Such paper cassettes 50 accommodate a large number of paper sheets P. The paper sheet P, drawn from the paper cassettes 50, is supplied to a transporting path 53. The transporting path 53 extends up to a discharge port 54 via the driven roller 30. The discharge port 54 is disposed close to a discharge tray 55.

At a position facing to the driven roller 30 on the transporting path 53, a secondary transfer roller 57 is disposed while pinching the transfer belt 25. A resist roller 58 is disposed in front of the driven roller 30 and the secondary transfer roller 57. The paper sheet P is fed between the transfer belt 25 and the secondary transfer roller 57 by the resist roller 58. The secondary transfer roller 57 transfer the visible images, which are transferred to the transfer belt 25, to the paper sheet P, which is fed from the resist roller 58. A heat roller 59, a pressure roller 60 and a discharge roller 61 are provided in an end portion of the transporting path 53.

Hooks 71, 72, 73 and 74 are disposed near the primary transfer rollers 41, 42, 43 and 44. The hooks 71, 72, 73 and 74 move axes of the primary transfer rollers 41, 42, 43 and 44 vertically.

Figure 2:
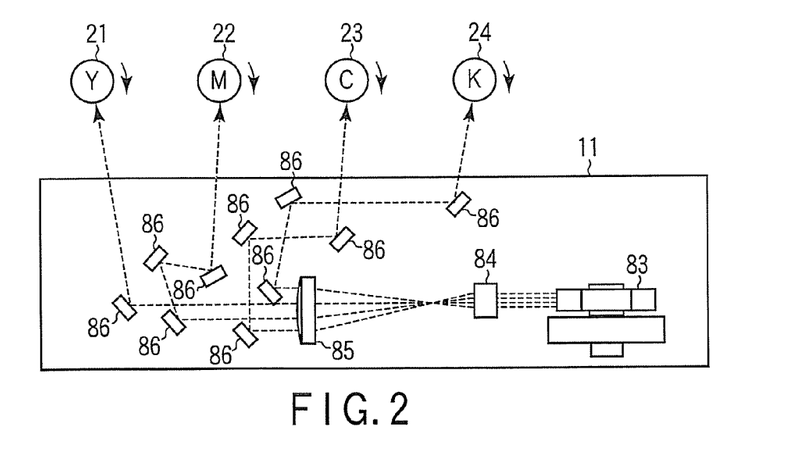
FIG. 2 is a perspective view illustrating an outline of an exposure unit of the embodiment.
Figure 3:
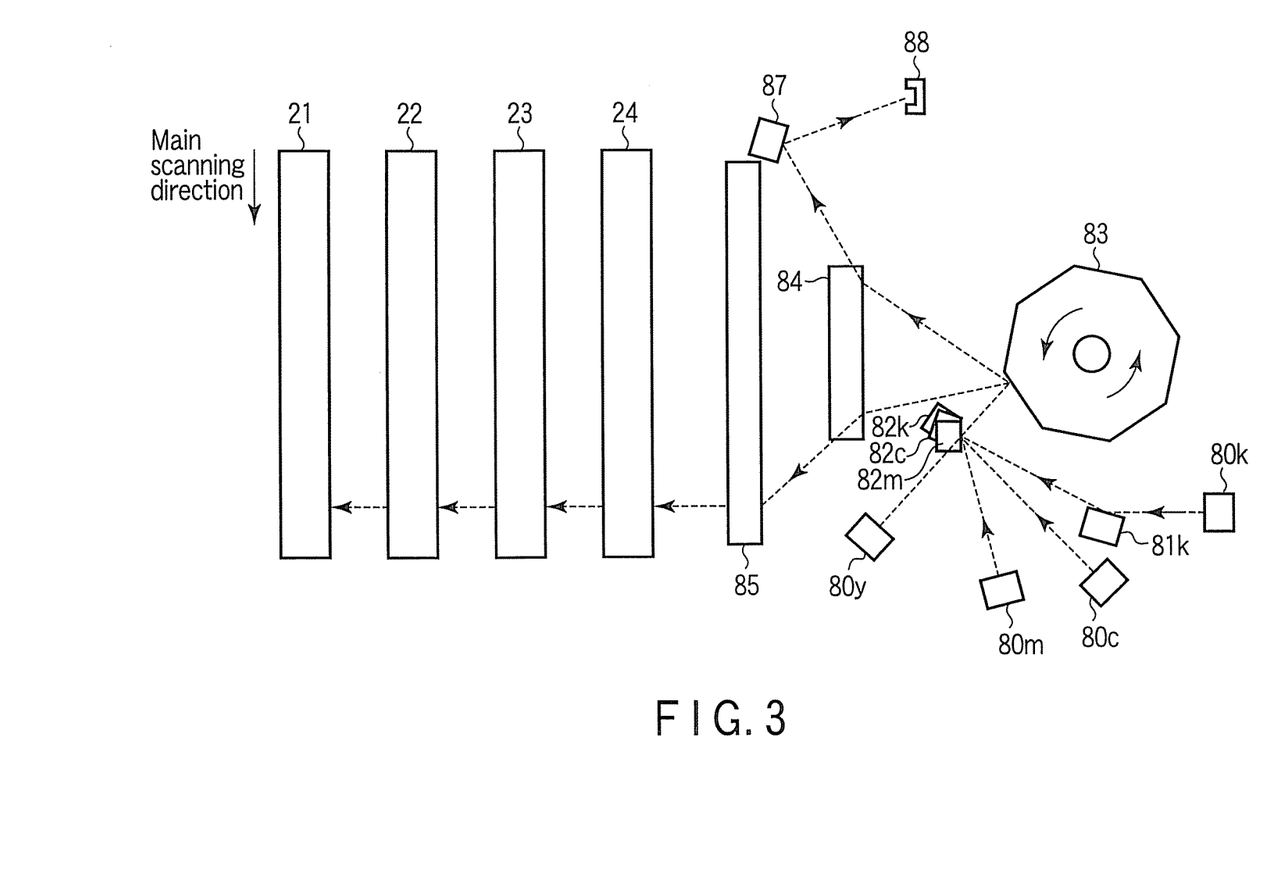
FIG. 3 is a plan view illustrating the outline of the exposure unit of the embodiment.

An outline of the exposure unit 11 is illustrated in FIGS. 2 and 3. FIG. 2 is a diagram seen from the side. FIG. 3 is a diagram seen from the above.

The laser beam, which is emitted from the laser unit 80y for the yellow color image forming, is radiated to the photoconductive drum 21 through a polygon mirror 83, lenses 84 and 85 and one of mirrors 86. The radiated laser beam mainly scans the photoconductive drum 21 in the axis direction thereof through the rotation of the polygon mirror 83. The main scanning thereof is repeated accompanying the rotation of the photoconductive drum 21. The repetition is the sub-scanning.

When starting the main scanning, the laser beam, which is emitted from the laser unit 80y for yellow color image forming, is radiated to a laser detecting unit 88 via the polygon mirror 83, the lens 84 and a mirror 87. The laser detecting unit 88 detects the radiated laser beam as a main scanning reference position.

The laser beam, which is emitted from the laser unit 80m for the magenta color image forming, is radiated to the photoconductive drum 22 through a mirror 82m, the polygon mirror 83, the lenses 84 and 85 and plural mirrors 86. The radiated laser beam mainly scans the photoconductive drum 22 in the axis direction thereof through the rotation of the polygon mirror 83. The main scanning thereof is repeated accompanying the rotation of the photoconductive drum 22. The repetition is the sub-scanning.

The laser beam, which is emitted from the laser unit 80c for the cyan color image forming, is radiated to the photoconductive drum 23 through a mirror 82c, the polygon mirror 83, the lenses 84 and 85 and plural mirrors 86. The radiated laser beam mainly scans the photoconductive drum 23 in the axis direction thereof through the rotation of the polygon mirror 83. The main scanning thereof is repeated accompanying the rotation of the photoconductive drum 23. The repetition is the sub-scanning.

The laser beam, which is emitted from the laser unit 80k for the black color image forming, is radiated to the photoconductive drum 24 through mirrors 81k and 82k, the polygon mirror 83, the lenses 84 and 85 and plural mirrors 86. The radiated laser beam mainly scans the photoconductive drum 24 in the axis direction thereof through the rotation of the polygon mirror 83. The main scanning thereof is repeated accompanying the rotation of the photoconductive drum 24. The repetition is the sub-scanning.

Figures 4, 6:
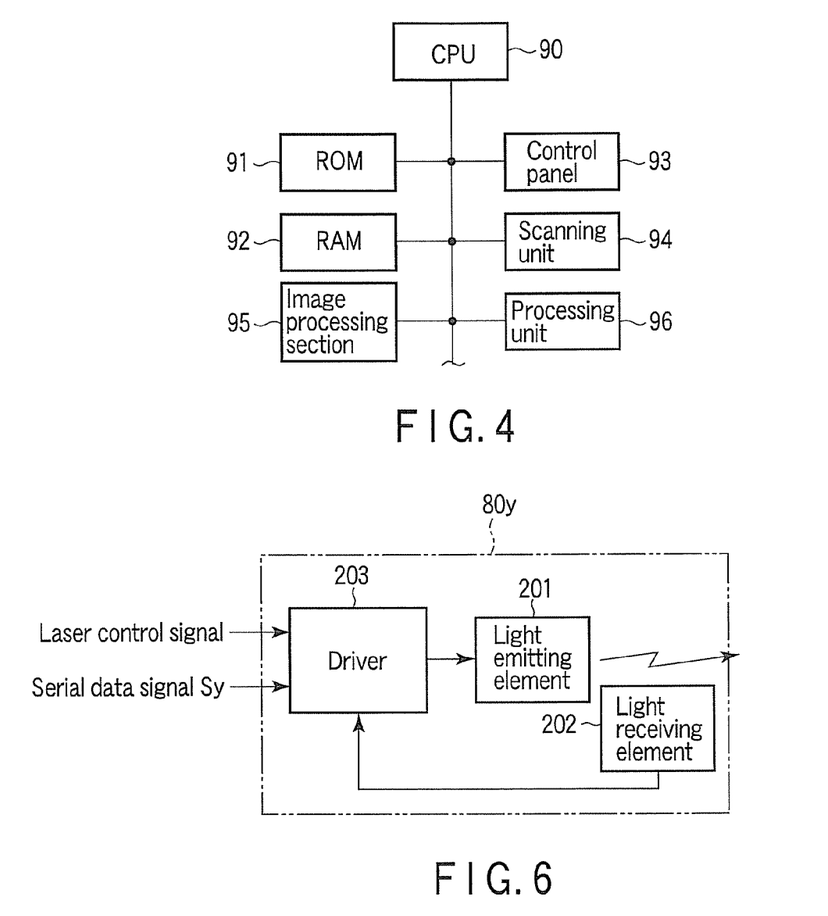
FIG. 4 is a block diagram illustrating a control circuit of the embodiment.
FIG. 6 is a diagram illustrating a configuration of respective laser units of the embodiment.

Here, a control circuit of the main body 1 is illustrated in FIG. 4.

A CPU 90 that functions as a main control section is connected to a ROM 91, a RAM 92, a control panel 93, a scanning unit 94, an image processing section 95 and a processing unit 96. The scanning unit 94 includes the carriage 4, the exposure lamp 5, the reflective mirrors 6, 7 and 8, the lens block 9, the CCD 10 and the like and optically reads the document image. The image processing section 95 outputs the image data by processing the read image of the scanning unit 94. The processing unit 96 includes the exposure unit 11, the photoconductive drums 21, 22, 23 and 24, the transfer belt 25, the driver roller 26, the driven roller 30, the primary transfer rollers 41, 42, 43 and 44, the secondary transfer roller 57, the hooks 71, 72, 73 and 74 and a print engine 100 shown in FIG. 5. In addition, the processing unit prints the image corresponding to the image date which is output from the image processing section 95 to the paper sheet P.

Figure 5:
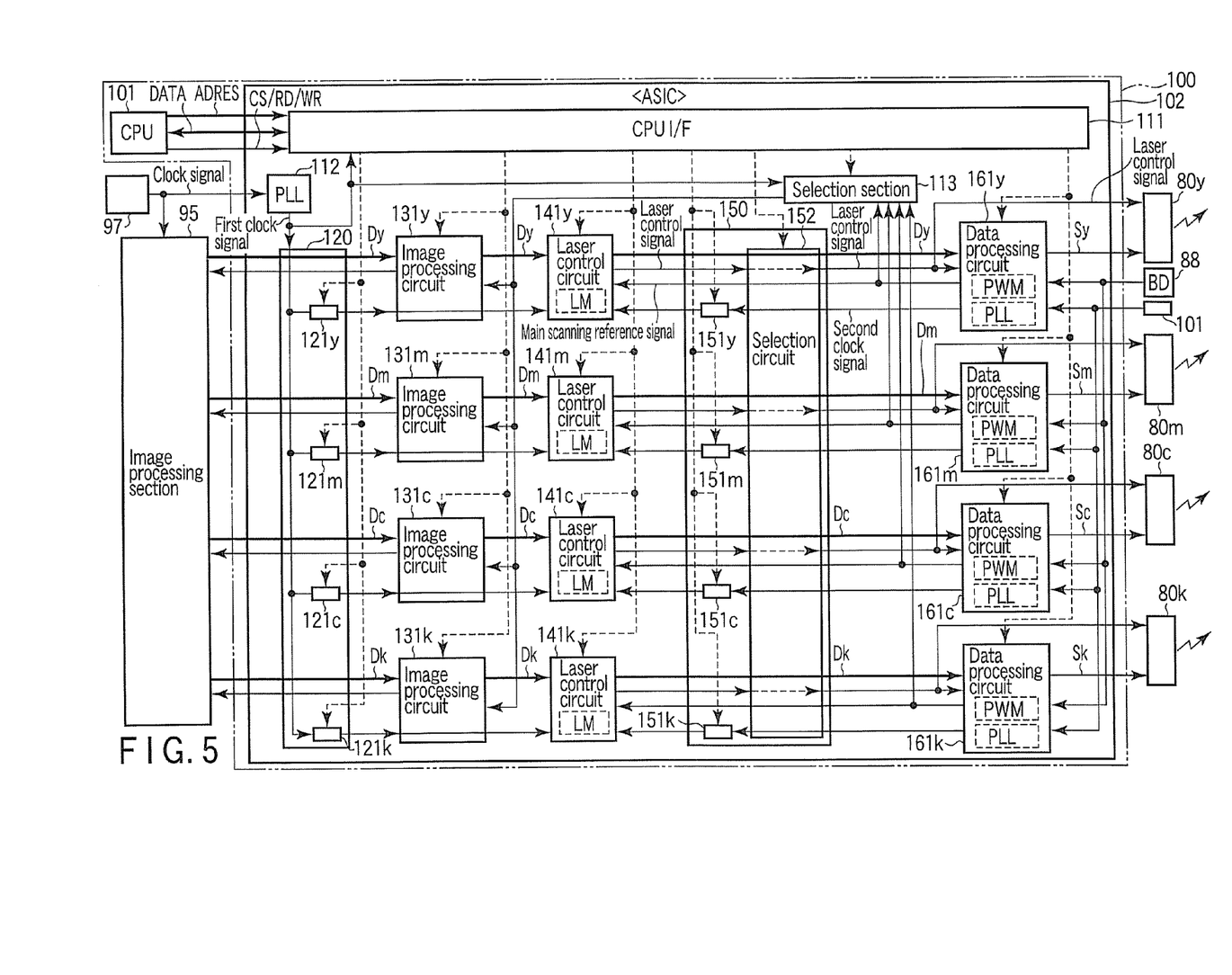
FIG. 5 is a block diagram illustrating an integrated circuit used in controlling for the exposure unit and the periphery thereof of the embodiment.

The print engine 100 includes a CPU 101 which functions as the control section and an integrated circuit 102 having an ASIC configuration. The integrated circuit 102 includes a CPU interface 111 connected to the CPU 101, a PLL circuit 112, a selection section 113 connected to the CPU interface 111, a selection section 120 connected to the CPU interface 111, a plurality of image processing circuits 131y, 131m, 131c and 131k connected to the CPU interface 111, a plurality of laser control circuits 141y, 141m, 141c and 141k connected to the CPU interface 111, a selection section 150 connected to the CPU interface 111 and a plurality of data processing circuits 161y, 161m, 161c and 161k connected to the CPU interface 111.

The PLL circuit 112 converts a clock signal, which is emitted from the external oscillator 97, into a first clock signal having predetermined frequency.

The image processing circuits 131y, 131m, 131c and 131k process the image data, input from the image processing section 95, in accordance with the first clock signal input via the selection section 120 and output the processed image data based on the main scanning reference signal which is input via the selection section 113 at a predetermined timing. The image processing circuits 131y, 131m, 131c and 131k are operated in accordance with the input of the first clock signal and stopped when the first clock signal is not input.

The laser control circuits 141y, 141m, 141c and 141k momentarily hold the image data, which is output from the image processing circuits 131y, 131m, 131c and 131k, in a line memory inside thereof and output the held image data according to the second clock signal input via the selection section 150. The laser control circuits generate the laser control signals for controlling the operation of the laser units 80*y*, 80*m*, 80*c* and 80*k* according to the main scanning reference signal input via the selection section 150 and output the signals. The laser control circuits 141*y*, 141*m*, 141*c* and 141*k* are operated through the second clock signal being input and stopped when the second clock signal is not input. The laser control signal is in the low level (first level) during the period until reception of the main scanning reference signal and is in the high level (second level) during the predetermined period after receiving the main scanning reference signal. The predetermined period is the period of the main scanning.

The data processing circuits 161*y*, 161*m*, 161*c* and 161*k* are operated in response to the laser control signals output from the laser control circuits 141*y*, 141*m*, 141*c* and 141*k* and convert the image data Dy, Dm, Dc and Dk output from the laser control circuits 141*y*, 141*m*, 141*c* and 141*k* into serial data signals Sy, Sm, Sc and Sk having pulse widths which correspond to the concentration of the image data Dy, Dm, Dc and Dk and output the signals synchronizing with the detection signal of the laser detection unit 88. Moreover, the data processing circuits output the signal which is synchronized with the detection signal of the laser detecting unit 88 as the main scanning reference signal, adjust the clock signal, which is emitted from the external oscillator 101, to a clock signal having the frequency corresponding to the image forming magnification in the main scanning direction and output the signal as the second clock signal. The data processing circuits 161*y*, 161*m*, 161*c* and 161*k* are operated by reception of the laser control signal and stopped when the laser control signal is not received.

The selection section 113 selects any one of the main scanning reference signals which are output from the data processing circuits 161*y*, 161*m*, 161*c* and 161*k*, for example, selects the main scanning reference signal output from data processing circuit 161*y* and supplies the image processing circuits 131*y*, 131*m*, 131*c* and 131*k* with the selected main scanning reference signals.

The selection section 120 includes a plurality of gate circuits (first gate circuits) 121*y*, 121*m*, 121*c* and 121*k* that allow and block the input of the first clock signal to the image processing circuits 131*y*, 131*m*, 131*c* and 131*k* by opening and closing.

The selection section 150 includes a plurality of gate circuits (second gate circuits) 151*y*, 151*m*, 151*c* and 151*k* and a selection circuit 152. The gate circuits 151*y*, 151*m*, 151*c* and 151*k* allow and block the input of the second clock signal to the laser control circuits 141*y*, 141*m*, 141*c* and 141*k* by opening and closing.

The selection circuit 152 includes a first selection mode that respectively selects the laser control signals output from the laser control circuits 141*y*, 141*m*, 141*c* and 141*k* and supplies the laser units 80*y*, 80*m*, 80*c* and 80*k* and the data processing circuits 161*y*, 161*m*, 161*c* and 161*k* with the selected signals. The selection circuit 152 also includes a second selection mode that selects any one of the laser control signals output from the laser control circuits 141*y*, 141*m*, 141*c* and 141*k* and supplies a plurality of the laser units having a specific laser unit among the laser units 80*y*, 80*m*, 80*c* and 80*k* and the data processing circuits 161*y*, 161*m*, 161*c* and 161*k* and a plurality of the data processing circuits which correspond to the above plurality of the laser units with the selected laser control signal. In addition the selection circuit 152 is capable of selectively setting the first selection mode or the second selection mode. Specifically, in the second selection mode, the laser control signal output from the laser control circuit 141*k* is selected and then the selected laser control signal is supplied to the laser units 80*y* and 80*k* and the data processing circuits 161*y* and 161*k*. The specified laser unit is the laser unit 80*y* which radiates the laser beam to the laser detecting unit 88.

As shown in FIG. 6, the laser unit 80*y* includes a light emitting element 201 which emits the laser beam, a light receiving element 202 which receives a part of the laser beam emitted from the light emitting element 201 and a driver 203. The driver 203 adjusts light emitting output of the light emitting element 201 in accordance with the light receiving output of the light receiving element 202 while driving the light emitting element 201 when the supplied laser control signals are in the low level (the first level) and drives the light emitting element 201 in accordance with the serial data signals Sy, Sm, Sc and Sk output from the data processing circuits 161*y*, 161*m*, 161*c* and 161*k* when the supplied laser control signals are in the high level (second level). Other laser units 80*m*, 80*c* and 80*k* also have the same configuration.

Figure 7:
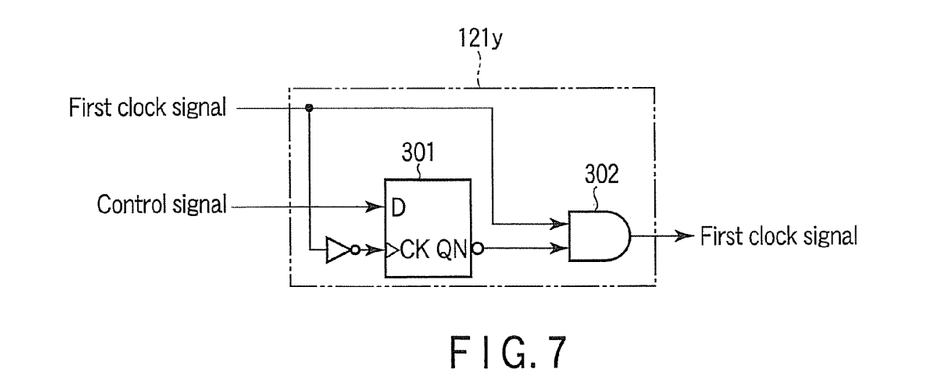
FIG. 7 is a diagram illustrating a configuration of respective gate circuits in FIG. 5.

As shown in FIG. 7, the gate circuit 121*y* has a flip-flop circuit 301 and an AND circuit 302 and controls the output of the first clock signal in accordance with the control signal supplied from the CPU 110 via the CPU interface 111. Other gate circuits 121*m*, 121*c*, 121*k*, 151*y*, 151*m*, 151*c* and 151*k* also have the same configuration.

The CPU 110 has the following sections (1) to (3) that perform major functions.

(1) A first control section configured to open all of the gate circuits 121*y*, 121*m*, 121*c*, 121*k*, 151*y*, 151*m*, 151*c* and 151*k* when performing color printing (the color image forming mode) using the photoconductive drums 21, 22, 23 and 24 and set the first selection mode in the selection circuit 152 as well.

(2) A second control section configured to close the remaining gate circuits while only opening the gate circuits 121*k* and 151*k* when performing monochrome printing (monochrome image forming mode) using only the photoconductive drum 24 and set the second selection mode in the selection circuit 152.

(3) A third control section configured to execute the switch between the first selection mode setting and the second selection mode setting in the above selection circuit 152 when switching color printing mode and monochrome printing mode after the laser control signal is changed from the low level (the first level) to the high level (the second level), for example, when a specified time t1 is passed.

Figure 8:
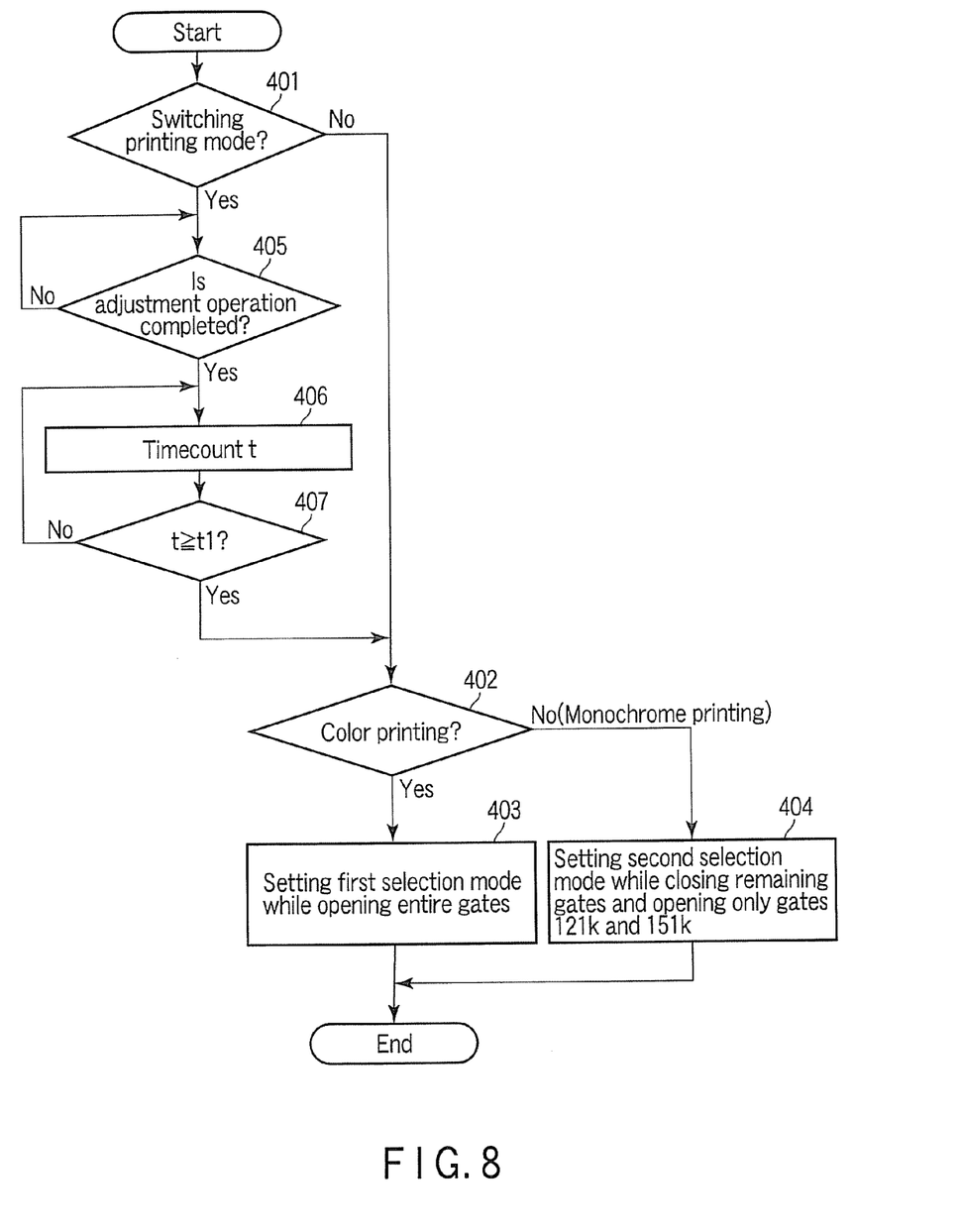
FIG. 8 is a flowchart illustrating control of a CPU of the embodiment.

The operation will be described with reference to FIG. 8.

When performing color printing (the color image forming mode) (NO in Act 401 and YES in Act 402), all of the gate circuits 121*y*, 121*m*, 121*c*, 121*k*, 151*y*, 151*m*, 151*c* and 151*k* are opened and the first selection mode of the selection circuit 152 is set (Act 403).

If the gate circuits 121*y*, 121*m*, 121*c* and 121*k* are opened, the first clock signals are supplied to the entire image processing circuits 131*y*, 131*m*, 131*c* and 131*k*, thereby operating all of the image processing circuits 131*y*, 131*m*, 131*c* and 131*k*.

If the gate circuits 151*y*, 151*m*, 151*c* and 151*k* are opened, the second clock signals are supplied to the entire laser control circuits 141*y*, 141*m*, 141*c* and 141*k*, thereby operating all of the laser control circuits 141*y*, 141*m*, 141*c* and 141*k*.

As shown in FIG. 5, if the first selection mode of the selection circuit 152 is set, the respective laser control signals output from the laser control circuits 141*y*, 141*m*, 141*c* and 141*k* are supplied to the data processing circuits 161*y*, 161*m*, 161*c* and 161*k* and the laser units 80*y*, 80*m*, 80*c* and 80*k* by the selection circuit 152. Therefore, the data processing circuits 161y, 161m, 161c and 161k and the laser units 80y, 80m, 80c and 80k are operated.

Figure 9:
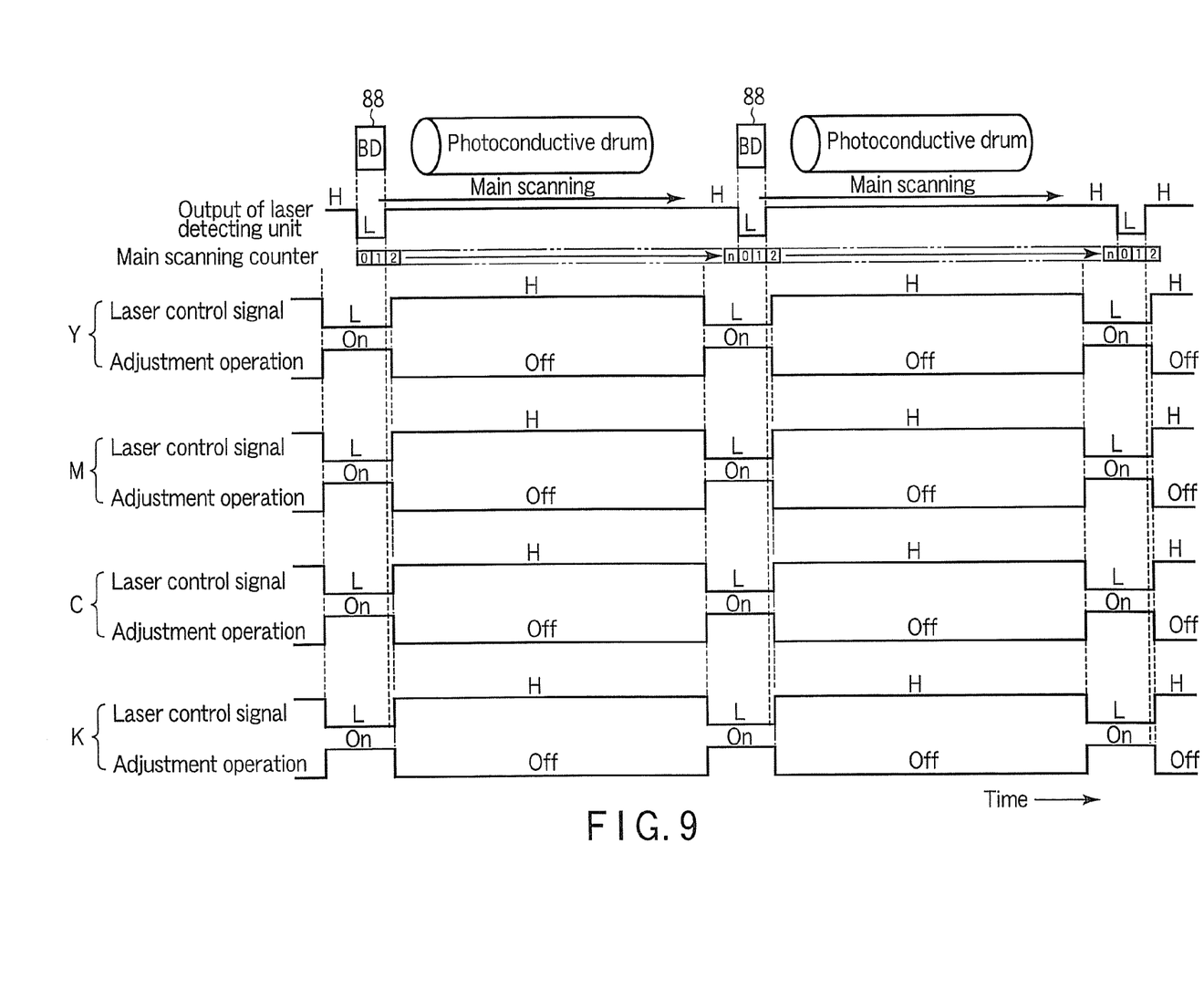
FIG. 9 is a time chart illustrating respective laser control signal and adjustment operation in FIG. 5.

In FIG. 9, the output of the laser detecting unit 88 during color printing, the respective laser control signals and the adjustment operation of the laser units 80y, 80m, 80c and 80k will be described.

When performing monochrome printing (the monochrome image forming mode) (NO in Act 401 and NO in Act 402), the remaining gate circuits are closed while only opening the gate circuits 121k and 151k and the second selection mode of the selection circuit 152 is set (Act 404).

If the gate circuit 121k is opened and the remaining gate circuits 121y, 121m and 121c are closed, the first clock signal is supplied to only the image processing circuit 131k, thereby operating the image processing circuit 131k and stopping the remaining image processing circuits 131y, 131m and 131c.

If the gate circuit 151k is opened and the remaining gate circuits 151y, 151m and 151c are closed, the second clock signal is supplied to only the laser control circuit 141k, thereby operating the laser control circuit 141k and stopping the remaining laser control circuits 141y, 141m and 141c.

Figure 10:
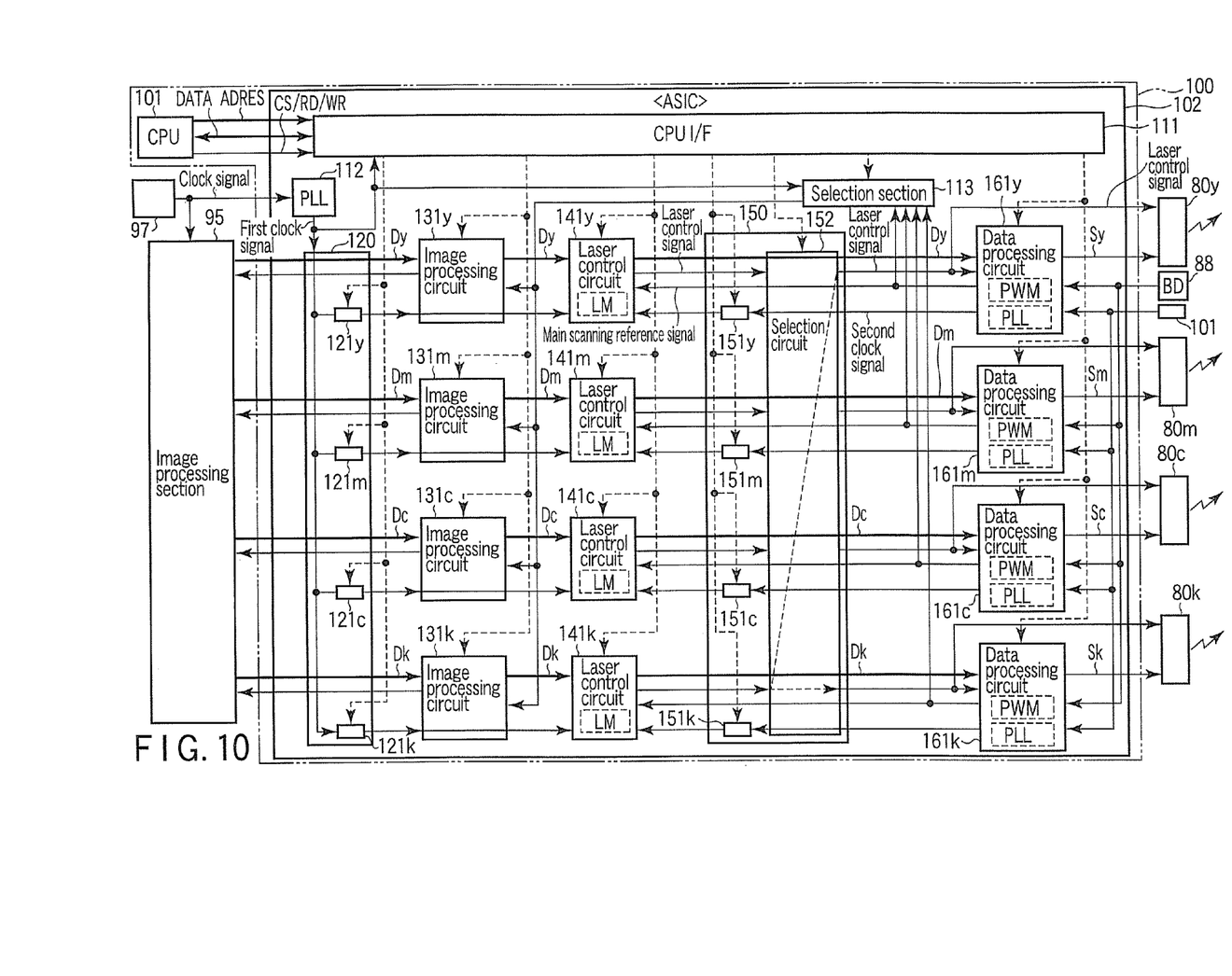
FIG. 10 is a block diagram illustrating a state in which the operation of the integrated circuit in FIG. 5 is changed.

As shown in FIG. 10, when the second selection mode of the selection circuit 152 is set, the laser control signals output from the laser control circuit 141k are supplied to the data processing circuits 161y and 161k and the laser units 80y and 80k by the selection circuit 152. Therefore, the data processing circuits 161y and 161k and the laser units 80y and 80k are operated and the data processing circuits 161m and 161c and the laser units 80m and 80c are stopped.

Figure 11:
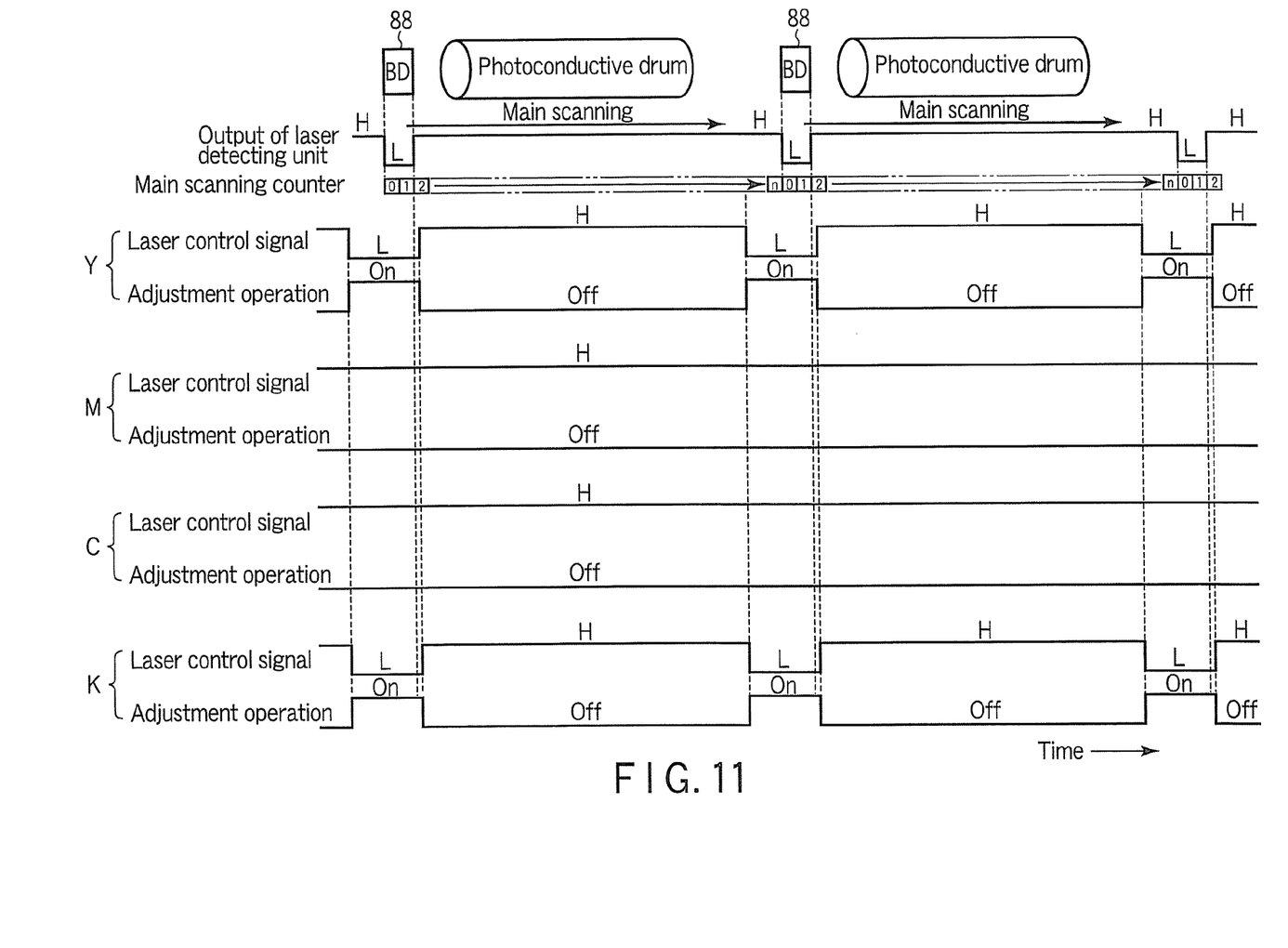
FIG. 11 is a time chart illustrating the respective laser control signal and the adjustment operation in FIG. 10.

In FIG. 11, the output of the laser detecting unit 88 in this case, the respective laser control signals and the adjustment operation of the laser units 80y, 80m, 80c and 80k will be described.

When performing monochrome printing, the operations of the image processing circuit 131k, the laser control circuit 141k, the data processing circuit 161k, and the laser unit 80k are necessary for the black image forming and the data processing circuit 161y and the laser unit 80y are necessary for generating the main scanning reference signal. On the other hand, the operations of the image processing circuits 131y, 131m and 131c, the laser control circuits 141y, 141m and 141c, the data processing circuits 161m and 161c and the laser units 80m and 80c are not necessary.

As seen from the above, when performing monochrome printing, since the image processing circuits 131y, 131m and 131c, the laser control circuits 141y, 141m and 141c and the data processing circuits 161m and 161c in the integrated circuit 102 are stopped, the power consumption of the integrated circuit 102 may be cut.

Figure 12:
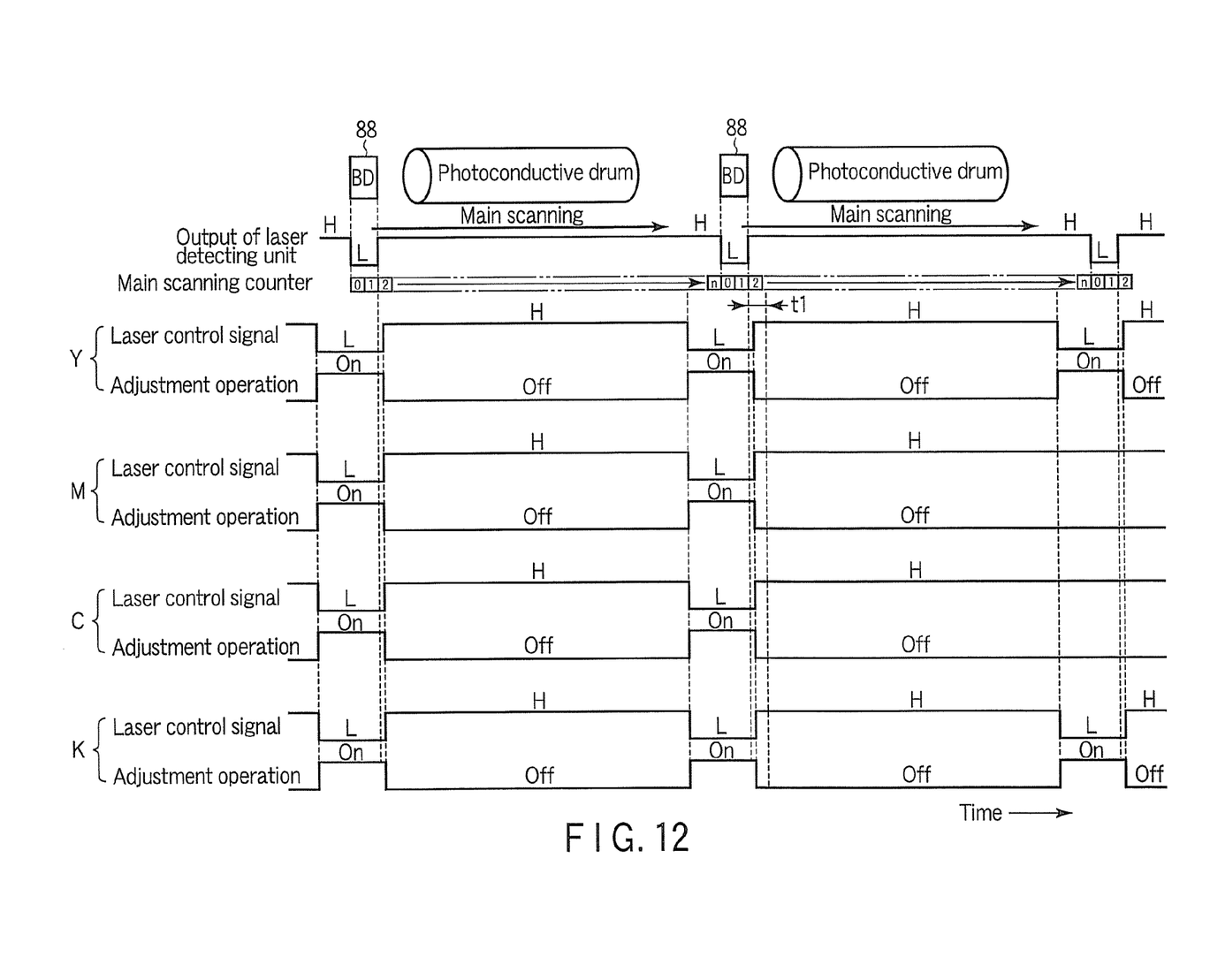
FIG. 12 is a time chart illustrating the respective laser control signal and the adjustment operation during mode switching in FIG. 10.

As shown in FIG. 12, when switched from color printing mode to monochrome printing mode (YES in Act 401), the laser control signal is changed from the low level to the high level and the adjustment operation of the respective laser units are completed (YES in Act 405) and after the specified time t1 based on timecount t has passed (YES in Act 405), the selection circuit 152 is switched into a state for monochrome printing mode (NO in Act 402, and Act 404).

In the same manner, even when switched from monochrome printing mode to color printing mode (YES in Act 401), the laser control signal is changed from the low level to the high level and the adjustment operation of the respective laser units are completed (YES in Act 405) and after the specified time t1 based on the timecount 1 is passed (YES in Act 405), the state of the selection circuit 152 is converted into a state for color printing (YES in Act 402, and Act 403).

The laser beam radiated to the laser detecting unit 88 is the laser beam emitted from the laser unit 80y during adjusting the laser unit 80y. As seen from the above, the state of the selection circuit 152 is switched after a specified time has passed from the time that the adjustment operations of the respective laser units are completed. Therefore, it is possible to obtain the laser beam of the laser unit 80y and the main scanning reference signal based on the output of the laser detecting unit 88 in appropriate states at all times.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus comprising:
a plurality of image holding bodies;
an exposure unit which includes a plurality of laser units which emits laser beams and performs main scanning and sub-scanning of the respective image holding bodies by the laser beam emitted from the respective laser units;
a laser detecting unit that detects the laser beam emitted from one specific laser unit among the laser units as a reference position of the main scanning;
an integrated circuit that includes a plurality of image processing circuits which process input image data in accordance with input first clock signals and output the processed image data at predetermined timing based on main scanning reference signals which is input; a plurality of laser control circuits which momentarily hold the output image data from the respective image processing circuits, output the held image data in accordance with input second clock signals, generate laser control signals for controlling the operation of the laser units in accordance with the main scanning reference signals, and output the laser control signals; a plurality of data processing circuits which are operated in accordance with the laser control signals output from the laser control circuits, convert the image data output from the respective laser control circuits into serial data signals then output the signals, output signals synchronized with detection of the laser detecting unit as the main scanning reference signals, and output clock signals having predetermined frequency as the second clock signals; a selection section which selects any one of the main scanning reference signals output from the data processing circuits and supplies the signals to the respective image processing circuits; a plurality of first gate circuits which allow and block the input of the first clock signals to the respective image processing circuits by opening and closing; a plurality of second gate circuits which allow and block the input of the second clock signals to the respective laser processing circuits by opening and closing; and a selection circuit which has a first selection mode which respectively selects the laser control signals output from the laser control circuits and supplies the selected signals to the respective laser units and the respective data processing circuits, a second selection mode which selects any one of the laser control signals output from the laser control circuits and supplies the selected laser control signals to a plurality of the laser units having the specified laser unit among the laser units and the data processing circuits and to a plurality of data processing circuits corresponding to a plurality of the laser units, and is capable of selectively setting the first selection mode or the second selection mode; and a control section that sets the first selection mode in the selection circuit while opening all of the gate circuits in a case of an image forming mode using the respective image holding bodies and sets the second selection mode in the selection circuit while closing the remaining gate circuits whereas only opening the first gate circuits and the second gate circuits which correspond to the specific image holding bodies among the respective gate circuits in a case of the image forming mode using only one specific image holding body among the respective image holding bodies.

2. The apparatus of claim 1, wherein the respective image processing circuits are operated by the first clock signals being input and stopped when the first clock signals are not input, wherein the respective laser control circuits are operated by the second clock signals being input and stopped when the second clock signals are not input, and wherein the respective data processing circuits are operated by the laser control signals being received and stopped when the laser control signals are not received.

3. The apparatus of claim 1, wherein the respective data processing circuits convert the image data output from the respective laser control circuits into serial data signals having pulse widths which correspond to the concentration of the image data and output the signals.

4. The apparatus of claim 1, wherein the respective data processing circuits output clock signals having a frequency which corresponds to image forming magnification in the main scanning direction as second clock signals.

5. The apparatus of claim 1, wherein the respective laser units includes a light emitting element which emits the laser beam, a light receiving element which receives a part of the laser beam emitted from the light emitting element, a driver which adjusts emission output of the light emitting element in accordance with the reception output of the light receiving element while driving the light emitting element when the laser control signals are in a first level and drives the light emitting element in accordance with the serial data signals output from the respective data processing circuits when the laser control signals are in a second level.

6. The apparatus of claim 5, wherein the respective laser control circuit outputs the signals which is in the first level during a period until reception of the main scanning reference signals and is in the second level during a predetermined period after receiving the main scanning reference signals.

7. The apparatus of claim 6, wherein the predetermined period is the period of the main scanning.

8. The apparatus of claim 6, wherein the control section switches between the settings of the first selection mode and the settings of the second selection mode after changing the laser control signals from the first level to the second level.

9. An image forming apparatus comprising:

a first photoconductive drum, a second photoconductive drum, a third photoconductive drum and a fourth photoconductive drum;

an exposure unit that includes a first laser unit which emits a laser beam for exposing the first photoconductive drum, a second laser unit which emits a laser beam for exposing the second photoconductive drum, a third laser unit which emits a laser beam for exposing the third photoconductive drum and a fourth laser unit which emits a laser beam for exposing the fourth photoconductive drum and performs main scanning and sub-scanning of the respective photoconductive drums by the laser beam emitted from the respective laser units;

a laser detecting unit that detects the laser beam emitted from the first laser unit as a main scanning reference position;

an integrated circuit that includes a first image processing circuit, a second image processing circuit, a third image processing circuit and a fourth image processing circuit which process input image data in accordance with the input first clock signals and output the processed image data at a predetermined timing based on the main scanning reference signals which is input; a first laser control circuit, a second laser control circuit, a third laser control circuit and a fourth laser control circuit which hold the output image data momentarily from the respective image processing circuits, output the held image data in accordance with the input second clock signals, generate laser control signals for controlling the operation of the laser units in accordance with the main scanning reference signals and output the laser control signals; a first data processing circuit, a second data processing circuit, a third data processing circuit and a fourth data processing circuit which are operated in accordance with the laser control signals output from the laser control circuits, convert the image data output from the respective laser control circuits into serial data signals then output the signals, output signals synchronized with detection of the laser detecting unit as the main scanning reference signals, and output clock signals having predetermined frequency as the second clock signals; a selection section which selects any one of the main scanning reference signals output from the data processing circuits and supplies the signals to the respective image processing circuits; a first gate circuit, a second gate circuit, a third gate circuit and a fourth gate circuit which allow and block the input of the first clock signals to the respective image processing circuits by opening and closing; a fifth gate circuit, a sixth gate circuit, a seventh gate circuit and a eighth circuit which allow and block the input of the second clock signals to the respective laser processing circuits by opening and closing; and a selection circuit which has a first selection mode which respectively selects the laser control signals output from the laser control circuits and supplies the selected signals to the respective laser units and the respective data processing circuits, a second selection mode which selects the laser control signals output from the fourth laser control circuit and supplies the selected laser control signals to the first laser unit, the fourth laser unit, the first data processing circuit and the fourth data processing circuit, and is capable of setting the first selection mode or the second selection mode selectively; and a control section that sets the first selection mode in the selection circuit while opening all of the gate circuits in a case of a color image forming mode using the first, second, third and forth image holding bodies and sets the second selection mode in the selection circuit while closing the remaining gate circuits whereas opening only the fourth gate circuit and the eighth gate circuit in a case of a monochrome image forming mode using only the fourth photoconductive drum.

10. The apparatus of claim 9, wherein the first photoconductive drum is used in image forming for yellow, the second photoconductive drum is used in image forming for magenta, the third photoconductive drum is used in image forming for cyan, and the fourth photoconductive drum is used in image forming for black.

11. The apparatus of claim 9, wherein the respective image processing circuits are operated by the first clock signal being input and stopped when the first clock signal is not input,
  wherein the respective laser control circuits are operated by the second clock signal being input and stopped when the second clock signal is not input, and
  wherein the respective data processing circuits are operated by reception of the laser control signal and stopped when the laser control signal is not received.

12. The apparatus of claim 9, wherein the respective data processing circuits convert the image data output from the respective laser control circuits into the serial data signals having pulse widths which correspond to a concentration of the image data and output the signals.

13. The apparatus of claim 9, wherein the respective data processing circuit output the clock signals having a frequency which corresponds to image forming magnification in the main scanning direction as the second clock signals.

14. The apparatus of claim 9, wherein the respective laser units includes a light emitting element which emits the laser beam, a light receiving element which receives a part of the laser beam emitted from the light emitting element, a driver which adjusts light emitting output of the light emitting element in accordance with the light receiving output of the light receiving element while driving the light emitting element when the laser control signals are in a first level and drives the light emitting element in accordance with the serial data signals output from the respective data processing circuits when the laser control signals are in a second level.

15. The apparatus of claim 14, wherein the respective laser control circuits output the signal which is in the first level during a period until receiving the main scanning reference signal and is in the second level during a predetermined period after receiving the main scanning reference signal as the laser control signals.

16. The apparatus of claim 15, wherein the predetermined period is a period of the main scanning.

17. The apparatus of claim 15, wherein the control section switches between a setting of the first selection mode and a setting of the second selection mode after the change of the laser control signals from the first level to the second level.

* * * * *